Oct. 12, 1965  R. C. JAYE  3,211,437
AIR PURIFYING APPARATUS
Filed Aug. 7, 1961  5 Sheets-Sheet 3
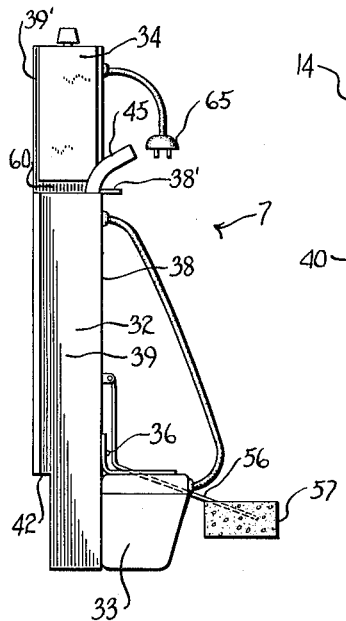
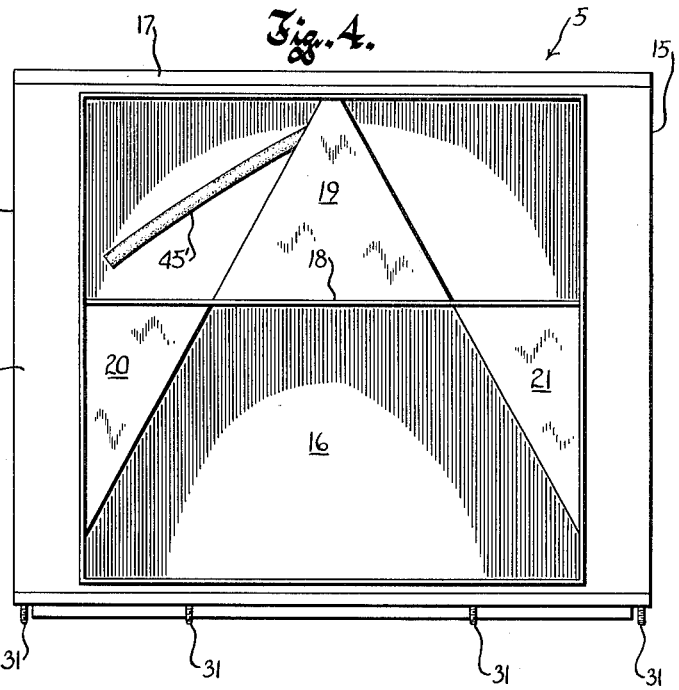
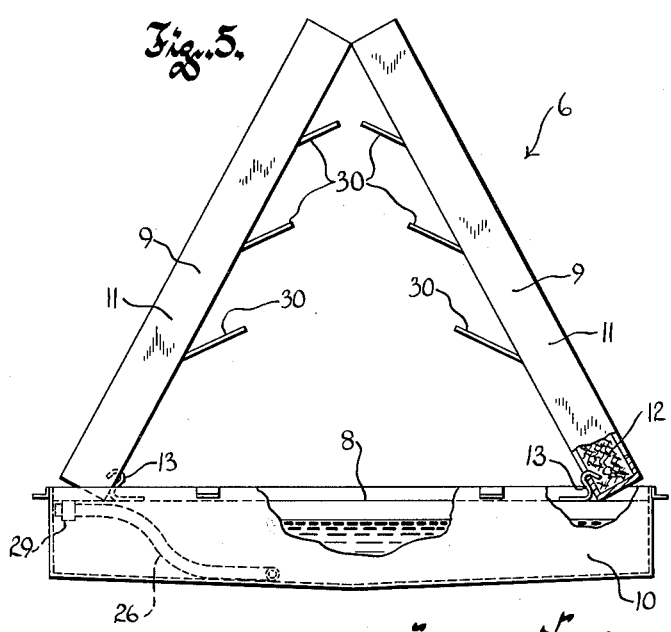

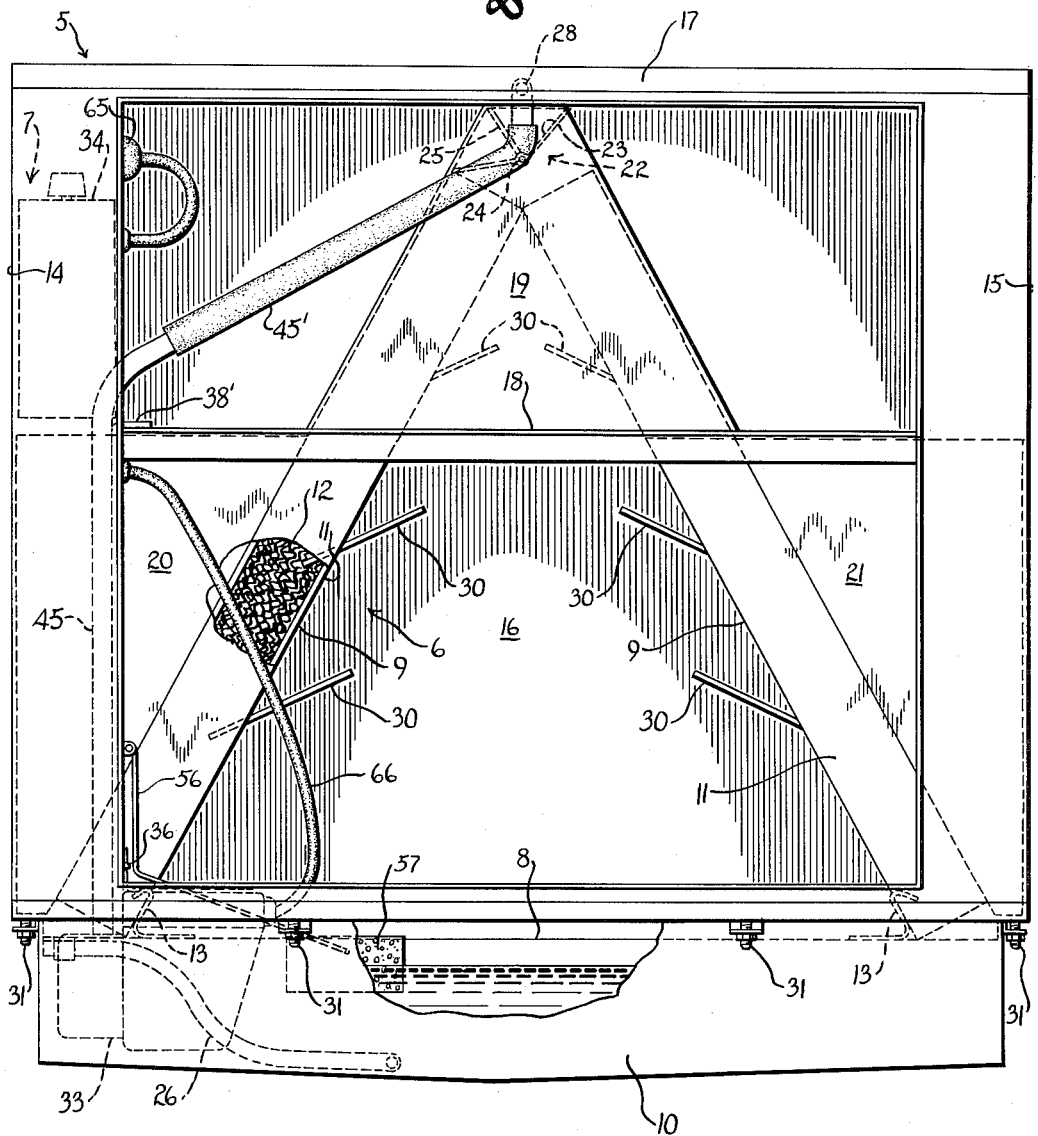

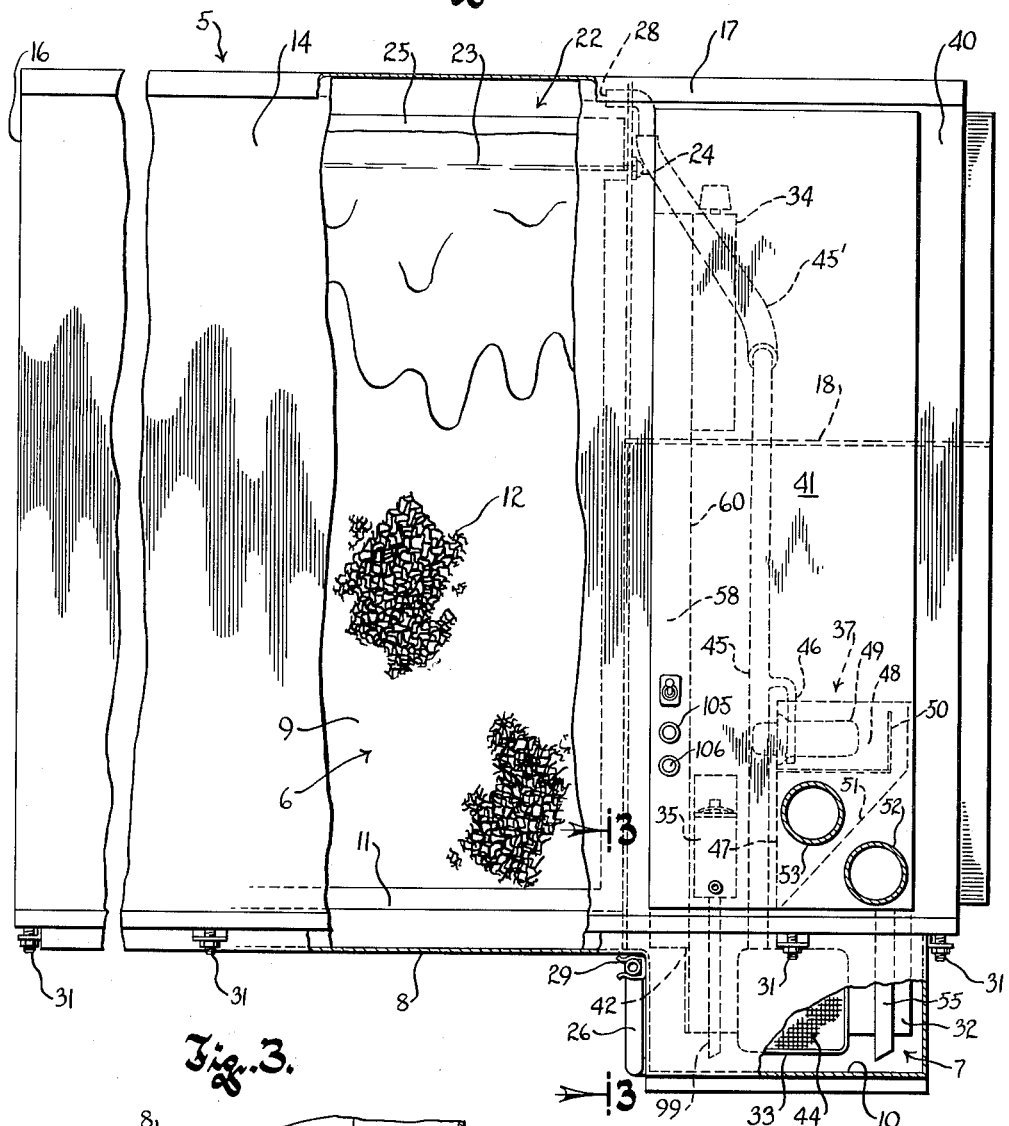
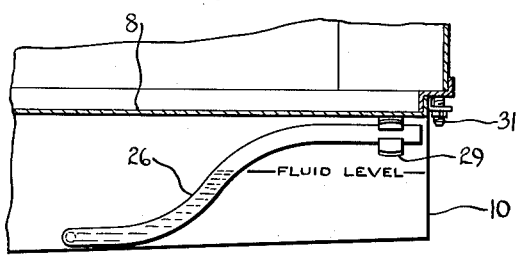

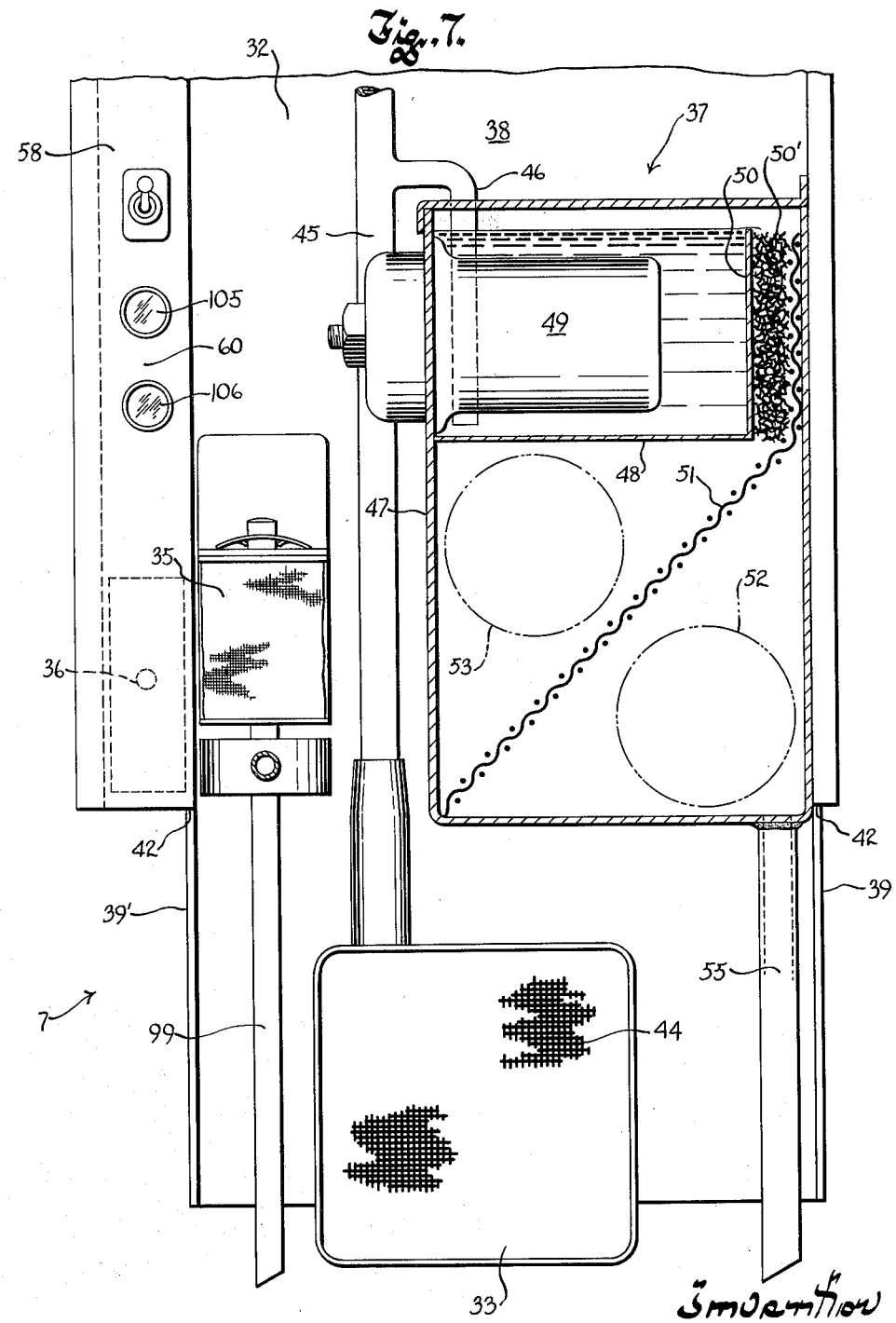

Oct. 12, 1965  R. C. JAYE  3,211,437
AIR PURIFYING APPARATUS
Filed Aug. 7, 1961  5 Sheets-Sheet 5

INVENTOR
Richard C. Jaye
By
Attorneys

United States Patent Office 3,211,437
Patented Oct. 12, 1965

3,211,437
AIR PURIFYING APPARATUS
Richard C. Jaye, 1025 Richards St., Watertown, Wis.
Filed Aug. 7, 1961, Ser. No. 129,719
9 Claims. (Cl. 261—3)

This invention relates to air purifying and conditioning apparatus and pertains more particularly to apparatus of the type wherein triethylene glycol or a similar liquid is used to effect purification, deodorization and humidification or dehumidification of air.

In apparatus of the type here under consideration triethylene glycol or a similar liquid is periodically washed downwardly across an obliquely inclined filter element so that the filter mesh is wetted thereby. The triethylene glycol greatly increases the ability of the filter to catch particles of dust and dirt which may be present in air circulating through the filter, and the constant washing of the liquid downwardly across and through the filter element carries away the dirt and dust particles caught in the filter mesh so that the filter element is kept clean. The triethylene glycol also serves to absorb odors from the air passed in contact with it, and has the further desirable effect of absorbing moisture from the air when humidity is high.

After moving across and through the filter element mesh, the triethylene glycol eventually flows by gravity to a sump, from which it is pumped back up to a liquid distributor located above the filter element, to be again washed downwardly through the filter and repeat its circulation cycle. Since the dust and dirt that have been filtered out of the air are collected in the triethylene glycol, the sump must be drained and cleaned from time to time and the used triethylene glycol must be discarded and replaced.

The odors that the triethylene glycol absorbs from the air circuated through the filter element are removed from it while the device is in operation. A portion of the triethylene glycol which is being circulated from the sump to the liquid distributor is bypassed through an aerating chamber where it is heated by a heating element and then, while hot, is passed downwardly across a screen or the like to expose it to a small volume of circulating air. The air circulated through the aerating chamber takes up the odors released from the heated liquid and carries them to a vent through which they are exhausted to the outside atmosphere.

When little or no water is mixed with triethylene glycol it has the ability to absorb humidity from the air, and conversely, when it is mixed with water it has the ability to give off moisture to relatively dry air. These properties of triethylene glycol are utilized in one form of apparatus of the type here under consideration to maintain a substantially constant humidity of the air being circulated through the filter elements, and to that end the apparatus can include means for filling water into the sump through a solenoid valve which is under the control of a humidistat. In another form of the apparatus water for humidification is brought to the device under the control of a humidistat and a solenoid valve but is not mixed with the triethylene glycol. In either case a liquid level responsive switch is connected in series with the solenoid valve and the humidistat to close the solenoid valve when unevaporated water in the device reaches a predetermined quantity.

The present invention has for its main object the provision of a very simple air purifying and conditioning device of the character described, which is capable of performing with great efficiency the three main functions of such apparatus, namely filtration, deodorization and humidity regulation of air circulated from an enclosure, and which device, moreover, is adapted to be very easily serviced and maintained.

More specifically, it is an object of this invention to provide a device of the character described which consists of three main units or subassemblies that are readily detachable and separable from one another to facilitate servicing and maintenance, and which comprise, generally, a filter unit that supports the filter elements of the apparatus and includes the sump or reservoir for the liquid used in the device, a housing unit which cooperates with the filter unit to enclose the same and to provide baffles by which circulating air is constrained to flow through the filters, and a control unit which includes the pump, aerating chamber, humidistat, float switch and solenoid valve.

It will be apparent that it is another object of this invention to provide an air purifying, deodorizing and humidity regulating apparatus of the character described wherein all of the electrical instrumentalities of the device are located on a single control unit which is readily removable as a unitary subassembly from the remainder of the device so as to permit easy access to the electrical instrumentalities thereon.

Still another specific object of this invention resides in the provision of a device of the character described having a sump which is provided with a transparent flexible drain tube that allows the sump to be quickly and conveniently drained and also serves as a sight gage by which the level of liquid in the sump can be readily determined, and wherein the sump and the filter elements comprise parts of a unitary subassembly that can be readily detached from the remainder of the apparatus to facilitate cleaning of the sump, and cleaning (or, if necessary, replacement) of the filter elements.

More specifically, it is an object of this invention to provide an air purifying device of the character described which is unusually adaptable to a variety of different installation situations, by reason of the fact that access can be had to all of the functional components of the device by removing the bottom wall of its housing and a small panel at the front of one side wall of the housing. Thus it is an important object of this invention to provide a device of the character described which can be installed directly alongside a wall of a building structure, or even in the corner formed by the junction of a pair of building walls, without the necessity for making compromises between a desirably out of the way installation of the unit and the requirement for accessibility to its removable parts so that it can be serviced.

Additional objects of this invention have to do with the fact that the water supply in many areas has a high mineral content, whereas in other areas water is available that is very low in minerals. Water that is substantially mineral free can be mixed directly with triethylene glycol used in apparatus of the type here under consideration, for humidification of air flowing through the device, and it is thus an object of this invention to provide such an air purifier which is well adapted for use with mixed water and triethylene glycol. However, water having a high mineral content cannot be satisfactorily mixed with triethylene glycol because the mineral residue that is left behind as the water evaporates eventually causes severe difficulties in the operation of the apparatus; and with this in mind it is a further and very important object of this invention to provide an air purifier of the character described that can be readily adapted for the evaporation of high mineral content water, unmixed with the triethylene glycol used in the machine, and without danger of the triethylene glycol becoming contaminated by the minerals in the water.

Thus it is the general object of this invention to provide a triethylene glycol air purifying and humidifying device which is extremely flexible in its adaptability to a wide variety of installations, not only with respect to the structure with which it can be associated but also with respect to the types of operation for which it is adapted, that is, with mixed water and triethylene glycol where low mineral content water is available, or with the water and triethylene glycol unmixed, in cases where the available water has a substantially high mineral content.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best mode so far devised for the practical application of the principles thereof, and in which:

FIGURE 1 is a front view of the air purifying device of this invention, with portions thereof broken away;

FIGURE 2 is a side view of the apparatus, with portions broken away;

FIGURE 3 is a fragmentary view taken on the plane of the line 3—3 in FIGURE 2 showing the sump and its drain tube;

FIGURE 4 is a front view of the housing unit of the device of this invention;

FIGURE 5 is a front view of the filter unit of the device, removed from the housing;

FIGURE 6 is a front view of the control and electrical instrumentalities unit;

FIGURE 7 is a view on an enlarged scale of the control unit subassembly as seen from the side thereof, with the cover removed and with the side wall of the aerating or deodorizing chamber also removed to show details of its interior construction;

Figure 8:
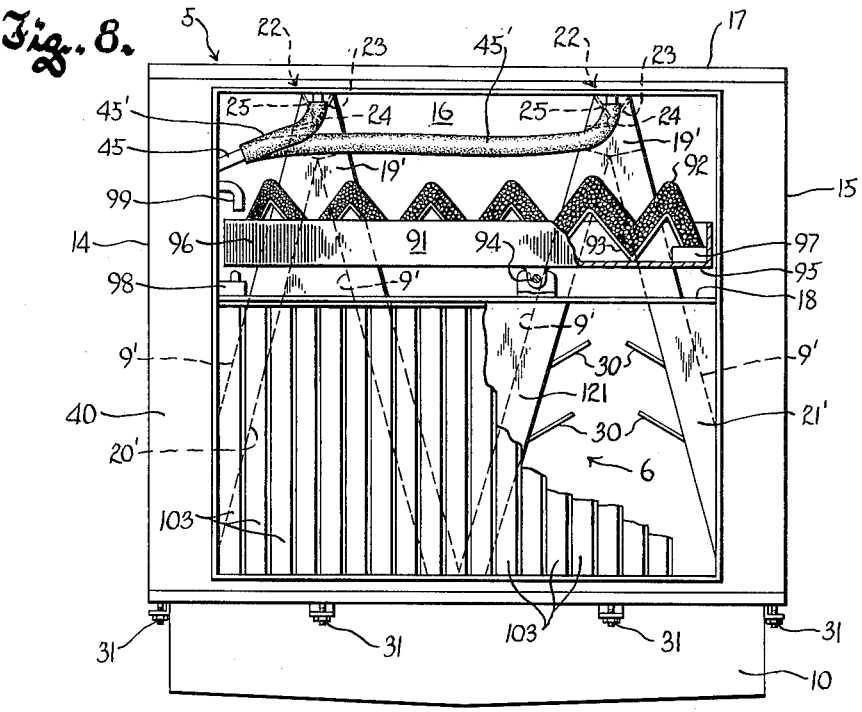
FIGURE 8 is a front view of a modified form of the air purifier of this invention, adapted for higher air flow rates and water having high mineral content.
Figure 9:
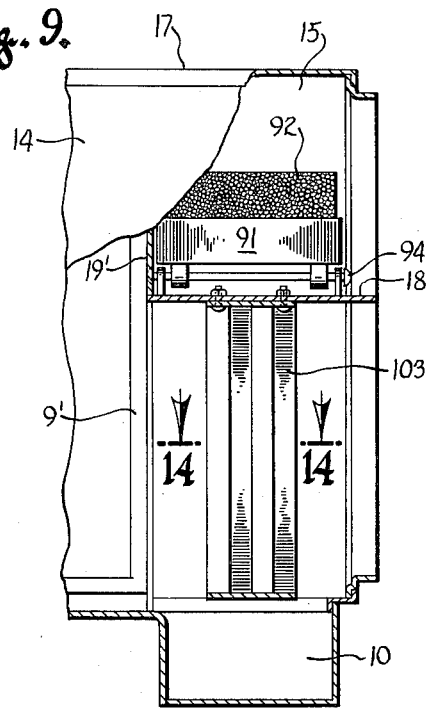
FIGURE 9 is a fragmentary side view of the device shown in FIGURE 8, with portions broken away to show interior details.
Figure 10:
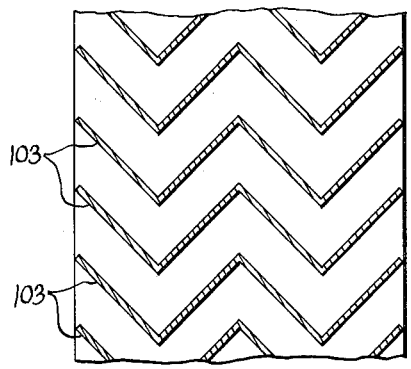
FIGURE 10 is a fragmentary sectional view taken on the plane of the line 14—14 in FIGURE 13.

Referring now more particularly to the accompanying drawings, in which like numerals designate like parts throughout the several views, the air purifying and humidifying device of this invention comprises three main units or subassemblies, namely a housing unit 5, which is best seen in FIGURES 1 and 4, a filter unit 6, which is best seen in FIGURES 1 and 5, and a control and electrical instrumentalities unit 7, which is illustrated in FIGURES 6 and 7. These three units are adapted to be quickly and easily assembled with one another to form the complete air purifying device, and to be disassembled from one another with equal facility.

The filter unit 6 comprises a substantially flat base portion 8 upon which a pair of filter elements 9 are supported, and a pan-like sump 10 which extends entirely across the front of the base portion of the unit with its bottom spaced below the level of the flat base portion 8. The sump and base portions can of course be readily formed from a single sheet metal blank.

The filter elements 9 are conventional flat type permanent filters, each comprising a metal frame 11 of channel shaped members supporting suitable filter packing 12 which defines numerous small tortuous air passages through the filter. Clips 13 secured to the base portion 8 and engaged around portions of the frames 11 of the filter elements hold the elements inclined at opposite oblique angles to the flat base portion of the unit, with their lower edges adjacent to the side edges of the base portion 8 and their upper edges joined along their lengths by any suitable means. In the embodiment of the invention illustrated in FIGURES 1-5 there are two filter elements, and viewed from the front or the rear, they form, with the base portion, an isosceles triangle. In the modified embodiment of the device illustrated in FIGURE 12, four filter elements 9' are used, arranged in the form of an inverted W as viewed from the front or rear of the housing, in order to provide a lower velocity flow of air through the filter meshes and thus accommodate a higher rate of air flow through the unit as a whole. In each case the filter elements are deep enough to extend along the entire length of the base portion 8 of the unit, from the sump to its rear edge.

The housing unit 5 cooperates with the flat base portion of the filter unit 6 to provide an enclosure for the filter elements, and constrains air to flow through the upwardly converging pairs of filters from their remote outer surfaces to the triangular space between them. To this end the housing unit has upright side wall portions 14 and 15 which generally face the outer surfaces of the filter elements and an upright rear wall 16 which may be integral with the side wall portions and which is snugly engaged by the rear edges of the filters when the filter unit is in place in the housing unit. Attention is directed to the fact that the side wall portion 14 of the housing unit terminates short of the front end of the unit, substantially in line with the front edges of the filters 9, to provide a space between its front edge and a corner post 40 in which the control unit 7 is receivable, as hereinafter explained.

It will be understood that the housing unit is provided with a suitable top closure panel 17 and that when the filter sub-assembly is installed in the housing unit the bottom of the housing unit is closed by the flat base portion of the filter unit and the sump portion thereof.

In the front portion of the housing unit, about midway between its top and bottom, there is a shelf-like horizontal baffle or divider 18 which extends substantially entirely across the housing unit, from one side wall 15 to within a short distance of the other side wall portion 14. The depth of this divider is such that its extends from the very front of the housing unit rearwardly to the rear edges of the filter elements 9. In one type of installation to be described hereinafter, the space above this horizontal divider constitutes an inlet for air to be circulated through the filter elements, while in all cases the space beneath it provides an air outlet.

To constrain incoming air to enter the filter elements from their outer surfaces, the housing member in the embodiment of the invention illustrated in FIGURES 1-5 includes an upright triangular baffle 19 which extends upwardly from the horizontal divider 18 to the top of the housing unit, and which is adapted to have its inclined marginal edge portions snugly about the front edges of the filter elements when the filter unit is installed in the housing unit, so that the baffle 19 blocks entry to the triangular space between the filters from the inlet space above the horizontal divided 18. To prevent the air passing through the housing unit from short circuiting the filter elements, the housing unit also includes upright triangular baffle members 20 and 21 which extend downwardly from the horizontal divided baffle 18 and which respectively have their outer edges contiguous to the side wall portions 14 and 15. The hypotenuse edge portions of the triangular baffles of course abut the front edges of the filter members when the filter unit 6 is assembled into the housing unit 5.

In the case of the embodiment of the invention shown in FIGURE 8, two triangular baffles 19' are required, each extending upwardly from the horizontal divider 18 to the top of the housing, to block entry of air to the triangular spaces between adjacent upwardly convergent filter elements from the inlet space above the horizontal divider 18. In addition to the triangular baffle members 20' and 21' at the sides of the housing, extending downwardly from the divider 18, and which correspond to the baffles 20 and 21 in the embodiment of the invention illustrated in FIGURES 1–5, there is a third lower baffle 121 which extends downwardly from the divider 18 and blocks the space between the two innermost filter elements.

Extending across the top of the housing unit from the front to rear thereof, directly over the filter elements 9, is a tilting pan-type of liquid distributor 22 comprising a shallow V-shaped trough 23 which is swingably mounted on a lengthwise extending pivot 24 that is located substantially at the junction of the converging side of the trough, below its center of gravity and vertically in line with the contiguous upper edges of the filter elements. A medial lengthwise extending partition 25 divides the interior of the trough into two adjacent compartments of V-shaped cross-section. In the case of the modified embodiment shown in FIGURE 12, two such swingable troughs 23 are provided, one at the junction of each upwardly converging pair of filter elements 9'.

When the device is in operation, liquid from the sump 10 is continuously pumped up to an outlet 28 located directly above the trough 23, vertically in line with the pivot 24. Since the trough tends to swing to one side or the other of the pivot axis, due to the location of the pivot below its center of gravity, it always tends to occupy one or the other of two positions, in each of which one of the two compartments defined by its central partition 25 is upright and vertically in line with the outlet 28 while the other is tilted so that liquid will spill out of it and down across the outer face of the filter element directly beneath it. When liquid has been filled into the upright compartment to a certain level, the unbalancing force of the weight of the liquid tips the distributor to its other position, spilling the liqud out of the newly filled compartment down across the outer face of the filter element therebeneath and bringing the previously emptied compartment to its upright position to be filled with liquid so that the process can be repeated. The two filter elements are thus alternately and periodically washed by flows of liquid downwardly across them from the liquid distributor.

Because of the obliquely inclined disposition of the filter elements, the liquid tends to flow downwardly and inwardly through their filter packings, and to drop down from their inner surfaces. However, deflectors 30 which project obliquely upwarly from the inner faces of the filter element frames tend to carry the liquid back into the filter meshes to insure complete saturation of the filter elements and thus promote optimum filtration and deodorization of air being circulated through the filter elements. Eventually, of course, the liquid makes its way to the bottom of the filter elements and flows along the flat base portion 8 of the filter unit, back into the sump 10 for recirculation.

To allow the sump 10 to be drained conveniently, a flexible drain hose 26 is connected to an outlet in the rear wall of the sump, near the bottom thereof. Normally, when drainage of the sump is not desired, the free end portion of the hose is engaged in a clip 29 on the side wall, near one end thereof, to be supported by the clip at a level above the normal liquid level in the sump, as best seen in FIGURE 3. Preferably the drain hose is made of transparent flexible plastic material so that when in its normal position it serves as a sight gage which reveals the level of liquid in the sump.

It will be understood that the housing unit 5 will usually be affixed to a building structure in such a way as to be suspended at some distance above the floor, so that the filter unit 6 can be assembled upwardly thereinto or removed downwardly therefrom. It will be evident that the filter units can therefore be readily removed from the housing regardless of any building wall or other structure that may be located in a position to block access to one or more sides of the housing. Preferably the filter unit is held in place in the housing unit by means of stud and nut securements 31 or similar fasteners, such as trunk latch type fasteners, which provide for quick disconnection of the two units from one another.

The control unit 7 comprises in general an upright channel shaped member 32 which fits in the opening between the front edge of the side wall portion 14 of the housing unit and the corner post 40 at the front of the housing unit, at the same side thereof as the wall portion 14. The channel shaped member 32 carries a humidistat 34 and a float switch 36, and mounted on its web portion 38 are a pump 33, a solenoid valve 35, and an aerating or deodorizing unit designated generally by 37.

When the control unit is assembled to the housing unit the flanges 39 and 39' of the channel shaped member 32 have their outer edges disposed substantially in the plane of the side wall portion 14 of the housing unit so as to offset or recess its web portion 38 inwardly of said plane. Preferably a panel or cover 41 is removably secured across the channel legs, flush with the side wall portion 14 of the housing unit, to close the recess defined by the channel shaped member and block access to the electrical instrumentalities mounted thereon.

When the control unit is assembled with the housing unit, one flange 39' of the channel shaped member 32 projects above the horizontal divider 18 and beyond the upper edge of the web portion 38 of the channel. The web portion 38 snugly abuts the adjacent end edge of the divider 18 and terminates in a rearwardly directed lip 38' that flatwise intimately engages over the adjacent end of the divider 18. This prevents the transfer of air between the inlet and outlet sides of the filters 9 around the control unit end of the divider 18.

At their lower ends the outer edges of the flange portions 39 and 39' of the channel member are cut back or notched as at 42 (see FIGURE 6), so as to be receivable in the sump when the apparatus is assembled, and the bottom of the channel member projects down below the normal liquid level in the sump to prevent short circuiting air flow through the channel member between the inlet and the outlet spaces above and below the divider 18.

The pump 33 is mounted at the bottom of the channel member to have its inlet in the sump, and preferably the pump inlet is protected by a screen 44. The outlet of the pump is connected to a length of hose or flexible plastic tubing 45 which extends upwardly along the web portion of the channel member and inwardly over the top thereof to be readily detachably telescopingly connected with an intermediate length of tubing 45' which communicates with the outlet 28 that empties into the liquid distributor trough 23.

Intermediate its top and bottom ends the hose or tube 45 has a small diameter branch outlet 46 which bypasses to the aerating or deodorizing unit 37 a portion of the output of the pump 33. The aerating unit comprises an enclosure 47, one wall of which can flatwise overlie the web portion 38 of the channel shaped member 32. The branch outlet 46 debouches into a small heating vessel 48 in the upper portion of the enclosure 47, in which there is a thermostatically controlled electric heating element 49. The liquid thus introduced into the vessel 48 is heated by the heating element 49, and the heated liquid flows out of the vessel, over the top of a side wall 50 thereof which serves as a weir, and into a mass of filter-like material 50' that not only serves as an air seal between the weir and the adjacent upright wall of the enclosure 47, but also distributes the liquid onto a downwardly and rearwardly inclined aerating screen 51. As the heated liquid flows downwardly across the screen it is exposed to a flow of air which is brought into the enclosure 47 through and air inlet opening 52 beneath the screen and which leaves the enlcosure through an air outlet 53 above the screen. Since the air circulated through the deodorizing unit carries off odors that are released from the liquid by the heating thereof, the outlet 53 is preferably connected, by means of a suitable duct 54, with a chimney or other outdoor exhaust. As the deodorized liquid falls to the bottom of the enclosure 47 it is carried back to the sump 10 through a return duct 55 connected to a drain in the bottom wall of the enclosure.

The humidistat 34 is mounted on the flange 39' of the channel-shaped upright member 32, near the top thereof, where it is exposed to air entering the device so as to be responsive to its humidity. When the humidity of the air falls below the level for which the humidistat is set, the humidistat effects opening of the solenoid valve 35, which is of course adapted to be connected with a water source, and which then admits water from said source. In the embodiment of the invention illustrated in FIGURES 1–7, which is intended for use with water having a low mineral content, the incoming water admitted through the solenoid valve 35 is sent to the sump 10, by way of a duct 99, to be mixed with the triethylene glycol. The water is evaporated out of the liquid by the air circulated through the filter elements, and when the humidity of the air reaches the level for which the humidistat is set, the humidistat breaks the solenoid circuit to stop further flow of water.

To prevent the sump from being filled to overflowing, the float switch 36 can be connected in series with the humidistat 34 and the solenoid valve 35. The actuator for the float switch comprises a float arm 56 which is pivotally mounted, for up and down swinging motion, on the back of the upright channel shaped member 32, and a float 57 on the free end of the float arm which is disposed in the sump 10, inwardly of the pump 33, when the appartus is assembled. The actuator of course causes the switch 36 to open when liquid in the sump rises to a predetermined level.

In the embodiment of the invention illustrated in FIGURE 8, which is particularly intended for use with water having a high mineral content, the horizontal divider 18 serves as a shelf that supports an elongated rectangular evaporator pan 91 into which water is introduced from the solenoid valve 35 when the humidistat 34 calls for increased humidity. A suitable wick 92, of urethane foam or the like, supported on a stiff wire screen 93, is arranged in up and down zigzag form along the length of the evaporator pan, to have its lower portions immersed in water in the pan and its upper portions exposed to air flowing into the housing across the top of the divider 18. The wick material can be sheet-like, with its faces parallel to the direction of air flow, so that it produces little air resistance but provides large surface area from which water can be evaporated. Mineral residue in the water tends to remain on the wick material, which can be readily and inexpensively replaced at regular intervals. Any mineral dust that might be carried off of the wick will of course be caught by the filter elements.

The evaporator pan is supported on a suitable pivot or fulcrum 94 for up and down swinging motion, transversely to its length. The pivot 94 is located closer to one end of the pan than the other, so that it in effect divides the pan into a shorter lever arm 95 and a longer lever arm 96, the latter being closer to the removable channel shaped member 32. A counterweight 97 at the outer end of the shorter lever arm overbalances the weight of the longer arm 96 when the pan is empty or only partially filled with water. However, when water in the pan reaches a predetermined level, its weight, acting on the longer lever arm 96, overbalances the counterweight, swinging the pan in the direction to cause its bottom to bear against a pressure responsive switch 98 that is mounted on the channel shaped member 32 with its actuator projecting upwardly through a small hole in the divider 18. The switch 98 is normally closed, but when it is tripped by the filled pan it opens the circuit to the solenoid valve 35 and stops flow of water into the pan until evaporation again permits the counterweight 97 to swing the pan to the position in which the switch can close.

Attention is directed to the fact that the unit shown in FIGURE 8 can be identical with that intended for operation with mixed water and triethylene glycol, except for the provision of the fulcrum 94, the pressure responsive switch 98 and, of course, the evaporator pan and wick. To convert from one type of operation to another, the flexible tube or duct 99 which comes out of the solenoid valve is led either to the sump 10 or the evaporator pan.

Where the evaporator pan is used, it is still desirable to provide the float switch 36, so connecting it that it turns off the pump 33 and deodorizing unit heater 49 when liquid in the sump 10 falls below a predetermined level.

The flange 39' on which the humidistat is mounted has a laterally rearwardly projecting lip or extension 58 thereon (best seen in FIGURE 7), and said flange and the extension provide walls of an enclosure 60 which mounts the float switch 36 and houses the wiring that connects with the humidistat, solenoid valve and float switch. The enclosure 60 can also house a junction box that provides for connection of the electrical instrumentalities of the device with the control switch of a furnace blower motor, the circuit arrangement being such that current is brought to the junction box whenever the blower motor is energized. A suitable plug-in connector 65, engageable in a female outlet (not shown) in the side wall 14 of the housing, enables the junction box to be quickly disconnected from the external wiring to the outlet on the housing, to allow the control unit to be separated from the rest of the apparatus as a complete subassembly. The enclosure 60 also houses wiring by which the motor of the pump 33 and the electric heating element 49 in the aerating unit can be energized whenever the furnace blower motor is in operation. The heating element 49, of course, should be energized only when a thermostatic switch therefore is closed, and it should be deenergized whenever the temperature of the liquid in the vessel 48 reaches a predetermined value on the order of about 170° F.

Where there is a high rate of air flow through the device, droplets of liquid may be blown off of the filter element from time to time, and to prevent them from being carried out of the unit a series of parallel, upright baffles 103 may be installed below the horizontal divider 18, suspended therefrom and extending downwardly to near the top of the sump 10. Each baffle has a zigzag configuration in the direction of air flow, and the baffles thus cooperate in defining a tortuous path for air leaving the unit, so that drops of liquid entrained in such air impinge their surfaces. It will be apparent that the baffles 103 do not interfere to any appreciable extent with air flow out of the unit. Liquid collected on these baffles of course drips directly down into the sump for recirculation through the system.

From the foregoing description taken together with the accompanying drawings, it will be apparent that this invention provides a simple, inexpensive and very efficient device of the type which utilizes triethylene glycol or a similar liquid and effects cleaning, deodorizing and humidification or dehumidification of air, which device comprises three main units or subassemblies that can be be readily assembled together or disassembled from one another, and is capable of installation in a variety of air conditioning and heating systems and under many different conditions of installation without requiring special concessions to its structural environment to permit access to the unit for servicing.

What is claimed as my invention is:

1. An air purifier of the character described comprising:
   (A) a housing having
      (1) a substantially flat bottom wall,
      (2) an elongated pan extending along the front edge of the bottom wall to provide a sump,
      (3) a substantially upright rear wall,
      (4) opposite substantially rectangular and upright side walls, one of which has its front edge spaced from the front of the housing, and
      (5) a removable panel spanning the space between the front edge of said one side wall and the front of the housing;
   (B) a pair of flat substantially rectangular filter elements in the housing inclined at opposite oblique angles to the bottom wall and having
      (1) their bottom edges engaging the bottom wall, laterally spaced apart, and extending substantially parallel to the side walls of the housing,
      (2) their rear upright edges engaged with the rear wall,
      (3) their front upright edges spaced from the front of the housing, and
      (4) their upper edges adjacent to one another;
   (C) liquid distributor means in the housing, over the adjacent upper edges of the filter elements, for debouching air purifying liquid onto the filter elements;
   (D) means for transferring air purifying liquid from the sump to said liquid distributor means comprising
      (1) a pump on said panel having its inlet in the sump, and
      (2) duct means communicating the outlet of the pump with said liquid distributor means;
   (E) a substantially horizontal shelf-like divider extending across the front of the housing intermediate the top and bottom thereof and over the sump, said divider having its rear edge engaging the front edges of the filter elements; and
   (F) upright transverse baffle means in the housing having sealing connections with the divider and with the front edges of the filter elements to constrain air which has been circulated into the housing from above the filter elements to pass downwardly through them and to leave the housing through the space between the divider and the pan, so that air purifying liquid entrained in such air can drop into the sump provided by the pan.

2. The air purifier of claim 1, further characterized by a tube of flexible transparent material, one end of which is secured at the bottom of said sump to provide an outlet through which liquid may be drained from the sump when the other end portion of said tube is permitted to drop below the level of said outlet; and a clip on the outside of the housing, spaced a substantial distance above the bottom of the sump, in which said other end portion of the tube can be engaged and by which it is supported to prevent drainage of liquid from the sump, with the tube serving as a sight gage which shows the level of liquid in the sump.

3. The air purifier of claim 1, further characterized by an elongated evaporator pan supported on said horizontal divider and into which water for humidification can be introduced, and evaporator means in said pan exposed to the space above the divider.

4. The air purifier of claim 1 further characterized by the fact that said liquid distributor means comprises:
   (A) a liquid outlet in the upper portion of the housing over the adjacent upper edges of the filter elements; and
   (B) an elongated tilting pan beneath the liquid outlet and extending lengthwise over the adjacent upper edges of the filter elements, said tilting pan comprising
      (1) a pair of lengthwise adjacent troughs and
      (2) means mounting the tilting pan for swinging motion about an axis which extends lengthwise of the tilting pan and is spaced below its center of gravity, whereby the pan can swing between a first position at which one trough is upright and beneath the liquid outlet to be filled therefrom while the other trough is spilling its contents onto one of the filter elements, and a second position to which said one trough tilts of its own weight when filled to a certain level and at which it spills its contents over the other filter element while the other trough is upright and beneath the liquid outlet.

5. The air purifier of claim 1, further characterized by: filter baffle means suspended from the divider, providing a tortuous path for air flowing out of the housing beneath the divider, said filter baffle means thus being adapted to capture drops of air purifying liquid entrained in such air and to drop such captured liquid into the sump.

6. The air purifier of claim 1, further characterized by the following:
   (A) means attaching the elongated pan that provides the sump to the bottom wall of the housing; and
   (B) means detachably securing the bottom wall of the housing to the rear and side walls of the housing so that the bottom wall, the sump and the filter elements can be removed from the housing as a unitary subassembly.

7. The air purifier of claim 1 further characterized by the fact that: said removable panel comprises an upright channel-shaped member having a web portion, said channel-shaped member having its web portion innermost with respect to the housing and having the lower part of its web portion received in the sump, below the level of liquid therein, and a medial part of its web portion abutting the divider, to prevent air from flowing around the divider between the spaces in the housing above and below the same.

8. The air purifier of claim 7 further characterized by regenerating means for deodorizing air purifying liquid comprising:
   (A) a heating vessel on a side of said removable panel which is externally of the housing;
   (B) by-pass duct means communicating the outlet of the pump with said heating vessel for transferring to the heating vessel a portion of the liquid withdrawn from the sump by the pump;
   (C) a heating element in said heating vessel;
   (D) an aerating chamber on said side of said panel, in overflow relation to the heating vessel;
   (E) means for circulating air through said aerating chamber so that odors can be carried away from heated liquid passing therethrough by such circulated air; and
   (F) return flow means communicating the aerating chamber with the sump.

9. The air purifier of claim 8 further characterized by control instrumentalities for the pump and heating element, conductors connecting such instrumentalities with the pump and heating element, and means mounting said control instrumentalities on said removable panel so that all of the electrical apparatus incorporated in the air purifier comprises with said removable panel a complete subassembly which is readily removable from the housing for inspection and service.

References Cited by the Examiner

UNITED STATES PATENTS

| | | | |
|---|---|---|---|
| 2,235,116 | 3/41 | Ray | 261—97 X |
| 2,502,137 | 3/50 | Fleisher | 261—97 X |
| 2,588,612 | 3/52 | Brookins | 261—97 |
| 2,752,134 | 6/56 | Paulus | 261—97 X |
| 2,881,853 | 4/59 | Kelley | 261—3 X |
| 2,959,032 | 11/60 | Davis | 261—104 X |

HARRY B. THORNTON, *Primary Examiner.*

HERBERT L. MARTIN, *Examiner.*